Patented Sept. 13, 1938

2,129,859

UNITED STATES PATENT OFFICE 2,129,859

PROCESS OF MAKING FONDANT

Carl S. Miner, Chicago, Ill., assignor, by mesne assignments, to Corn Products Refining Company, New York, N. Y., a corporation of New Jersey No Drawing. Application January 16, 1936, Serial No. 59,409

8 Claims. (Cl. 99—134)

This invention relates to the production of fondants, that is fine-grained mixtures of sugar crystals and syrup, with such other ingredients as may be required to give the desired flavor, texture or other characteristics to the product. The term "fondant", as used herein, comprises the creams used for the center of chocolate creams, and also fudges, cake icings, and other similar products or compositions of soft plastic character. The liquid phase or syrup may vary considerably in proportion to the solid phase, the sugar crystals, according to the use for which the particular product is intended.

Heretofore fondants have been usually made of cane or beet sugar by first dissolving the sugar, but sometimes of dextrose or dextrose and sucrose, completely in water, which is used, ordinarily, in excess of that required for a saturated solution, and then by evaporating enough of the water from the solution, ordinarily by boiling, until the solution is supersaturated, whereupon crystallization ensues, which may be hastened, and fineness of grain insured, by beating the mass. Other ingredients, such as chocolate, fats and flavoring substances may be added before the sugar crystallizes.

One of the principal objects of this invention is to provide a method of making fondants that will avoid the cooking step which requires time and attention and may detrimentally affect, according to the ingredients used, the taste and flavor of the product.

This object is accomplished by using as the primary sugar ingredient of the fondant anhydrous dextrose which becomes hydrated in the presence of water, and mixing with the anhydrous dextrose, in addition to flavoring or other ingredients of an optional character, water in an amount insufficient to reduce the dextrose to a solution but sufficient to effect its hydration. Some of the dextrose is dissolved and remains in solution to form part or all of the liquid or syrup phase of the fondant. The hydration operation may be carried out with all the ingredients at room temperature and without heating the mixture at any stage; the re-crystallization of the anhydrous dextrose as dextrose hydrate taking place because of the fact that dextrose hydrate is much less soluble within a range of temperatures including ordinary room temperatures than the anhydrous.

If desired, the ingredients of the particular fondant may be mixed together in a dry state, and in the proper proportions, so that all that is required for the making of the product is to add the requisite quantity of water and to beat or agitate the mixture as may be necessary. It is possible by control of agitation to control the size of the crystals in the fondant and produce small crystals, ordinarily desirable in this class of products, even when relatively coarse, granular anhydrous dextrose is used. It is preferable, however, in most cases to grind the anhydrous dextrose to a powder as this shortens the hydrating operation. There may be added to the fondant substances such as chocolate, cocoa, flavoring extracts, sugars sweeter than dextrose, such as cane sugar or invert sugar, and other substances to give the product the desired taste and flavor; also fats, milk powders, starch syrups, and other substances to give the product the desired texture and consistency; and also substances calculated to retard the crystallization of the fondant as set forth in application of Carl S. Miner and Alva Thompson, Method of controllably retarding the crystallization of dextrose, filed June 17, 1935, Serial No. 27,065; no claim being made herein, however, to the use of retarding agents as that subject matter is claimed in the pending application referred to.

The invention will be exemplified in the following specific examples with the understanding that these examples are preferential and illustrative and not to be considered as limiting the invention to the data given.

*Example 1—Formula for making fudge compound*

For preparation of a cold mix fudge a dry homogeneous mixture of the following ingredients in the proportions as follows is suitable:

| | Parts |
|---|---|
| Powdered anhydrous dextrose (commercial) | 300 |
| Powdered cane sugar | 50 |
| Powdered skimmed milk | 25 |
| Cocoa | 60 |
| Hydrogenated cocoanut fat, melting point 92° F | 30 |
| Salt | 2 |

In order that the hydration, or re-crystallization as hydrate of the anhydrous dextrose, should take place within a practical period of time, it is necessary that there be present in the mixture a certain quantity of hydrate dextrose to act as a nucleating agent. The amount may be very small. This hydrate dextrose may be added in small amount to the mixture of the above specified ingredients; but if ordinary commercial anhydrous dextrose is used, enough of the dextrose will be hydrated to provide the requisite amount of nucleating hydrate. The purging and washing of anhydrous dextrose in the centrifugal machine brings about hydration of the dextrose to some extent, and this hydration proceeds, though but slowly, if the dextrose is later in contact with moist atmosphere.

However, if the anhydrous dextrose itself is relied upon to supply the hydrate for nucelation, it is important, at least in order to facilitate and hasten the hydrating operation that the anhydrous dextrose be in a powdered state, since the hydrated dextrose, operating superficially on the anhydrous granules, will not act as efficiently in promoting hydrate crystallization as when it is in a finely divided state, more or less separate from the anhydrous sugar. The hydration involves progressive solution of the anhydrous and its re-crystallization as hydrate, only a small part, however, of the dextrose being in solution at any one time. For this reason also, it is desirable to pulverize the anhydrous dextrose, since solution of the smaller particles is more rapid. The amount of water used must be at least one molecule to the molecule of dextrose but in practice, of course, the water will be somewhat in excess of this. Some of the dextrose remains in a dissolved state forming the liquid phase, or a part of the liquid phase, of the fondant. In the formula given above the cane sugar or a part of it, will remain in the liquid phase being more soluble than dextrose.

The ingredients, as above specified, may be intimately mixed together either with or without water. Assuming that the mixture is a dry mixture, packaged, for example, in closed containers, to prepare the fudge about two-thirds of 60 parts of cool tap water or milk is added to 200 parts of the dry mixture and the ingredients stirred to a thick paste and beaten until smooth. Then the rest of the 60 parts of water is added and the beating continued until the mixture has thickened sufficiently, through hydrate crystallization of the dextrose, to turn out on a slab for cutting. In warm weather it is sometimes necessary to cool the mass in an ice box for a few minutes to hasten crystallization.

*Example 2—Formula for making cake icing compound*

The following ingredients are used by preference in the proportions as follows:

| | Parts |
|---|---|
| Powdered anhydrous dextrose (commercial) | 100 |
| Skimmed milk powder | 20 |
| Powdered sucrose | 30 |
| Powdered corn syrup (Karo) | 10 |
| Hydrogenated fat (Crisco type) | 22 |
| Cocoa | 25 |
| Salt and flavoring to taste. | |

The ingredients are intimately mixed and stored in closed containers until ready for use. To make the icing 5 parts of the dry material are mixed with one part of water and beaten. The resulting mixture can be readily spread on a cake with a spatula. Due to the presence in the product of crystallization retarders, to wit the skimmed milk powder, sucrose and Karo, the icing will remain soft for several days. In place of cocoa one could use any other flavoring substance.

*Example 3—Formula for making chocolate cream centers*

The following ingredients are used in the proportions as follows:

| | Parts |
|---|---|
| Corn syrup (glucose 43° Baumé) | 50 |
| Water | 105 |
| Anhydrous dextrose (commercial, granular not powdered) | 325 |
| Powdered dextrose hydrate | 2 |
| Invert syrup (75% solids) | 90 |

The anhydrous dextrose and hydrate dextrose are mixed into a solution consisting of 50 parts of the corn syrup in 105 parts of water and beaten until the graininess is no longer noticeable. This requires about ten minutes. Then the 90 parts of invert sugar syrup are beaten into the mix. The beating is then continued until the fondant has reached the desired consistency. This formula produces a very fine grained fondant having a smooth cool taste.

It will be obvious that in the formula given above, one could use powdered anhydrous dextrose either with or without hydrate dextrose, as a separate ingredient, if the anhydrous dextrose were partially hydrated as is the case with practically all commercail anhydrous dextrose. Similarly one could use granular anhydrous dextrose in Examples 1 and 2, instead of the powdered product, but in all cases where the granular anhydrous is used, it is desirable to introduce hydrate dextrose as a separate ingredient, and preferably in the powdered form.

In Example 3 the process serves to reduce the relatively large particle size of the initial anhydrous dextrose to the size of the tiny individual crystals characteristic of a fondant; and this reduction of particle size by re-crystallization instead of grinding is one of the important advantages of the invention.

*Example 4—Coatings on candies, fruit products and the like*

The process can also be utilized for the production of dextrose coatings on candies, fruit products and other materials for which coatings of this type are desirable. A strong adherent coating can be produced on such bodies by dampening the surface of the body, then bringing powdered anhydrous dextrose into contact with such damp surface. The powdered anhydrous dextrose should contain some hydrate nuclei and may contain also other ingredients such as the crystallization retarding agents of the pending application referred to above. The moisture on the surface of the body to be coated brings about the hydration of the anhydrous dextrose. This operation may be repeated as often as necessary in order to obtain a coating of the desired thickness.

It is the intention to cover all modifications of the above described products and processes within the scope of the appended claims.

I claim:

1. Process of making a fondant-like compound which comprises mixing with anhydrous dextrose a quantity of water sufficient for the hydration of the dextrose but insufficient to form a solution of all of the dextrose and beating the mixture until a fondant-like compound is produced.

2. Process of making a fondant-like compound which comprises mixing with anhydrous dextrose, and a small quantity of dextrose hydrate to initiate hydrate crystallization, a quantity of water sufficient for the hydration of the dextrose but insufficient to form a solution of all of the dextrose and beating the mixture until a fondant-like compound is produced.

3. Process of making a fondant-like compound which comprises mixing with powdered commercial anhydrous dextrose, slightly hydrated, a quantity of water sufficient for the complete hydration of the dextrose but insufficient to form a solution of all of the dextrose and beating the mixture until a fondant-like compound is produced.

4. Process of making a fondant-like compound which comprises mixing with anhydrous dextrose, and a small quantity of powdered dextrose hydrate, to initiate hydrate crystallization, a quantity of water sufficient for the hydration of the dextrose but insufficient to form a solution of all of the dextrose and beating the mixture until a fondant-like compound is produced.

5. Process of making a fondant-like compound which comprises mixing with anhydrous dextrose, without heating, a quantity of water sufficient for the hydration of the dextrose but insufficient to form a solution of all of the dextrose thereby and beating the mixture causing the crystallization to proceed at room temperature until a fondant-like compound is obtained having the desired balance between solid and liquid phases.

6. Process of making a fondant-like compound which comprises mixing with granular anhydrous dextrose and a small quantity of powdered dextrose hydrate, without heating, a quantity of water sufficient for the hydration of the dextrose but insufficient to form a solution of all of the dextrose beating the mixture and thereby causing the crystallization to proceed at room temperature until a fondant-like compound is obtained.

7. Process of producing a soft plastic composition comprising hydrate dextrose as a major constituent which comprises making a dry mixture of a major quantity of anhydrous dextrose and a nucleating quantity of hydrate dextrose, adding water in quantities sufficient for the hydration of substantially all of the anhydrous dextrose but insufficient for the solution of all of the dextrose present and stirring the mass during the period of crystallization to produce a fondant-like compound.

8. Process of producing fine grained fondant-like masses from coarse anhydrous dextrose without grinding which comprises preparing a mixture containing a major quantity of coarse grained anhydrous dextrose and a nucleating quantity of hydrate dextrose, adding water to said mixture in quantities sufficient to hydrate the anhydrous dextrose but insufficient to form a solution with all the dextrose present, and controlling the hydrate crystallization by stirring to produce a fondant-like compound containing small crystals of hydrate dextrose from the large crystals of anhydrous dextrose originally present.

CARL S. MINER.

CERTIFICATE OF CORRECTION.

Patent No. 2,129,859. September 13, 1938.

CARL S. MINER.

It is hereby certified that error appears in the printed specification of the above numbered patent requiring correction as follows: Page 1, first column, line 15, strike out the words "by first dissolving the sugar" and insert the same after "sucrose," in line 16; page 2, second column, line 14, for "commercail" read commercial; page 3, first column, lines 11 and 12, claim 5, for "thereby and beating the mixture" read beating the mixture and thereby; and that the said Letters Patent should be read with this correction therein that the same may conform to the record of the case in the Patent Office.

Signed and sealed this 1st day of November, A. D. 1938.

Henry Van Arsdale (Seal) Acting Commissioner of Patents.

and a small quantity of powdered dextrose hydrate, to initiate hydrate crystallization, a quantity of water sufficient for the hydration of the dextrose but insufficient to form a solution of all of the dextrose and beating the mixture until a fondant-like compound is produced.

5. Process of making a fondant-like compound which comprises mixing with anhydrous dextrose, without heating, a quantity of water sufficient for the hydration of the dextrose but insufficient to form a solution of all of the dextrose thereby and beating the mixture causing the crystallization to proceed at room temperature until a fondant-like compound is obtained having the desired balance between solid and liquid phases.

6. Process of making a fondant-like compound which comprises mixing with granular anhydrous dextrose and a small quantity of powdered dextrose hydrate, without heating, a quantity of water sufficient for the hydration of the dextrose but insufficient to form a solution of all of the dextrose beating the mixture and thereby causing the crystallization to proceed at room temperature until a fondant-like compound is obtained.

7. Process of producing a soft plastic composition comprising hydrate dextrose as a major constituent which comprises making a dry mixture of a major quantity of anhydrous dextrose and a nucleating quantity of hydrate dextrose, adding water in quantities sufficient for the hydration of substantially all of the anhydrous dextrose but insufficient for the solution of all of the dextrose present and stirring the mass during the period of crystallization to produce a fondant-like compound.

8. Process of producing fine grained fondant-like masses from coarse anhydrous dextrose without grinding which comprises preparing a mixture containing a major quantity of coarse grained anhydrous dextrose and a nucleating quantity of hydrate dextrose, adding water to said mixture in quantities sufficient to hydrate the anhydrous dextrose but insufficient to form a solution with all the dextrose present, and controlling the hydrate crystallization by stirring to produce a fondant-like compound containing small crystals of hydrate dextrose from the large crystals of anhydrous dextrose originally present.

CARL S. MINER.

CERTIFICATE OF CORRECTION.

Patent No. 2,129,859. September 13, 1938.

CARL S. MINER.

It is hereby certified that error appears in the printed specification of the above numbered patent requiring correction as follows: Page 1, first column, line 15, strike out the words "by first dissolving the sugar" and insert the same after "sucrose," in line 16; page 2, second column, line 14, for "commercail" read commercial; page 3, first column, lines 11 and 12, claim 5, for "thereby and beating the mixture" read beating the mixture and thereby; and that the said Letters Patent should be read with this correction therein that the same may conform to the record of the case in the Patent Office.

Signed and sealed this 1st day of November, A. D. 1938.

Henry Van Arsdale (Seal) Acting Commissioner of Patents.